United States Patent
Lai

(10) Patent No.: US 6,666,391 B2
(45) Date of Patent: Dec. 23, 2003

(54) AUTOMATICALLY RECIPROCAL MULTI-STAGE SUPPLY AND VENTILATION SYSTEM

(76) Inventor: Chien-Chou Lai, No. 64, Lane 412, Si de Road, Wu Feng Hsiang, Taichung County (TW)

( * ) Notice: Subject to any disclaimer, the term of this patent is extended or adjusted under 35 U.S.C. 154(b) by 141 days.

(21) Appl. No.: 10/042,017

(22) Filed: Jan. 10, 2002

(65) Prior Publication Data

US 2003/0127548 A1 Jul. 10, 2003

(51) Int. Cl.[7] ................................................ B05B 3/00
(52) U.S. Cl. .................. 239/752; 239/450; 239/289; 239/549; 239/566; 239/750
(58) Field of Search ..................... 239/289, 548, 239/549, 550, 450, 566, 750, 751, 752, 14.1; 47/2

(56) References Cited

U.S. PATENT DOCUMENTS

| | | | | |
|---|---|---|---|---|
| 2,756,759 A | * | 7/1956 | Swain | 239/550 |
| 4,913,357 A | * | 4/1990 | Bolyard et al. | 239/751 |
| 5,482,212 A | * | 1/1996 | Kobryn et al. | 239/752 |
| 6,372,053 B1 | * | 4/2002 | Belanger et al. | 239/566 |
| 6,547,156 B2 | * | 4/2003 | Jones | 239/752 |

* cited by examiner

Primary Examiner—Steven J. Ganey
(74) Attorney, Agent, or Firm—Charles E. Baxley

(57) ABSTRACT

An automatically reciprocal multi-stage supply and ventilation system includes two parallel tracks, and at least one set of material supply circulation unit mounted on the tracks. The material supply circulation unit includes a carrier device, a feeding device, a material distribution device, a nozzle device, and a ventilation device. The carrier device may be moved along the tracks reciprocally. The feeding device includes a water supply pipe, a material supply pipe, a water inlet pipe connected to a water source, and a material inlet pipe connected to a storage tank that contains fertilizer or pesticide therein. The material distribution device includes a water guide pipe, a material guide pipe, a fixing frame, a water distribution pipe, and a material distribution pipe. The nozzle device includes multiple water spray nozzles and material spray nozzles. The ventilation device includes multiple fans and motors.

3 Claims, 7 Drawing Sheets

AUTOMATICALLY RECIPROCAL MULTI-STAGE SUPPLY AND VENTILATION SYSTEM

BACKGROUND OF THE INVENTION

1. Field of the Invention

The present invention relates to an automatically reciprocal multi-stage supply and ventilation system, and more particularly to an automatically reciprocal multi-stage supply and ventilation system that may provide water, fertilizer and pesticide stably, evenly and efficiently.

2. Description of the Related Art

A conventional automatic sprinkler in accordance with the prior art shown in FIG. 8 comprises a frame 11, a transmission mechanism 12, a slide device 13, a sprinkle device 14, and a guide track 15.

In operation, the transmission mechanism 12 may force the frame 11 to slide and move on the guide track 15 reciprocally by the slide device 13, so that the sprinkle device 14 may sprinkle the water on a plant.

However, the water nozzle of the sprinkle device 14 can be used to sprinkle water only, and cannot be used to sprinkle the fertilizer or pesticide, thereby greatly limiting the versatility of the conventional automatic sprinkler. The water nozzle of the sprinkle device 14 may be replaced by another nozzle that may sprinkle the fertilizer or pesticide. However, the cost of time and manual work is increased. In addition, the residual fertilizer or pesticide in the supply pipe easily blocks the water nozzle of the sprinkle device 14. Further, when the conventional automatic sprinkler is used in a warm house of a large scale, it is necessary to provide a longer pipe to supply the water, and to provide a longer line to mate with movement of the sprinkle device 14, so that the pipe and the line are easily tangled with each other, thereby affecting the sprinkling work.

SUMMARY OF THE INVENTION

The present invention has arisen to mitigate and/or obviate the disadvantage of the conventional automatic sprinkler.

The primary objective of the present invention is to provide an automatically reciprocal multi-stage supply and ventilation system that may provide water, fertilizer and pesticide stably, evenly and efficiently.

Another objective of the present invention is to provide a an automatically reciprocal multi-stage supply and ventilation system that may control the temperature and moisture on the surface of the plant evenly and efficiently.

In accordance with the present invention, there is provided an automatically reciprocal multi-stage supply and ventilation system comprising: two parallel tracks, and at least one set of material supply circulation unit mounted on the tracks, the at least one material supply circulation unit including a carrier device, a feeding device, a material distribution device, a nozzle device, and a ventilation device, wherein:

the carrier device includes a plurality of carriers each of which is provided with rollers, one set of the rollers is connected to and driven by a drive mechanism, so that the rollers of each of the carriers may be driven by the drive mechanism to rotate on the tracks, so that the carrier device may be moved along the tracks reciprocally;

the feeding device includes a water supply pipe, a material supply pipe, a water inlet pipe made of a soft hose, and a material inlet pipe made of a soft hose, the water supply pipe and the material supply pipe are secured on the carrier device, the water inlet pipe has a first end connected to the water supply pipe and a second end connected to a water source, and the material inlet pipe has a first end connected to the material supply pipe and a second end connected to a storage tank that contains fertilizer or pesticide therein;

the material distribution device includes a water guide pipe, a material guide pipe, a fixing frame, a water distribution pipe, and a material distribution pipe, the water guide pipe has a first end connected to the water supply pipe and a second end connected to the water distribution pipe, the material guide pipe has a first end connected to the material supply pipe and a second end connected to the material distribution pipe, the fixing frame is secured on the carrier device to move therewith, the water distribution pipe and the material distribution pipe are secured on the fixing frame;

the nozzle device includes multiple water spray nozzles and material spray nozzles, the water spray nozzles are mounted on the water distribution pipe, and the material spray nozzles are mounted on the material distribution pipe 56; and the ventilation device is secured on the carrier device to move therewith.

Further benefits and advantages of the present invention will become apparent after a careful reading of the detailed description with appropriate reference to the accompanying drawings.

DETAILED DESCRIPTION OF THE INVENTION

Figure 1:
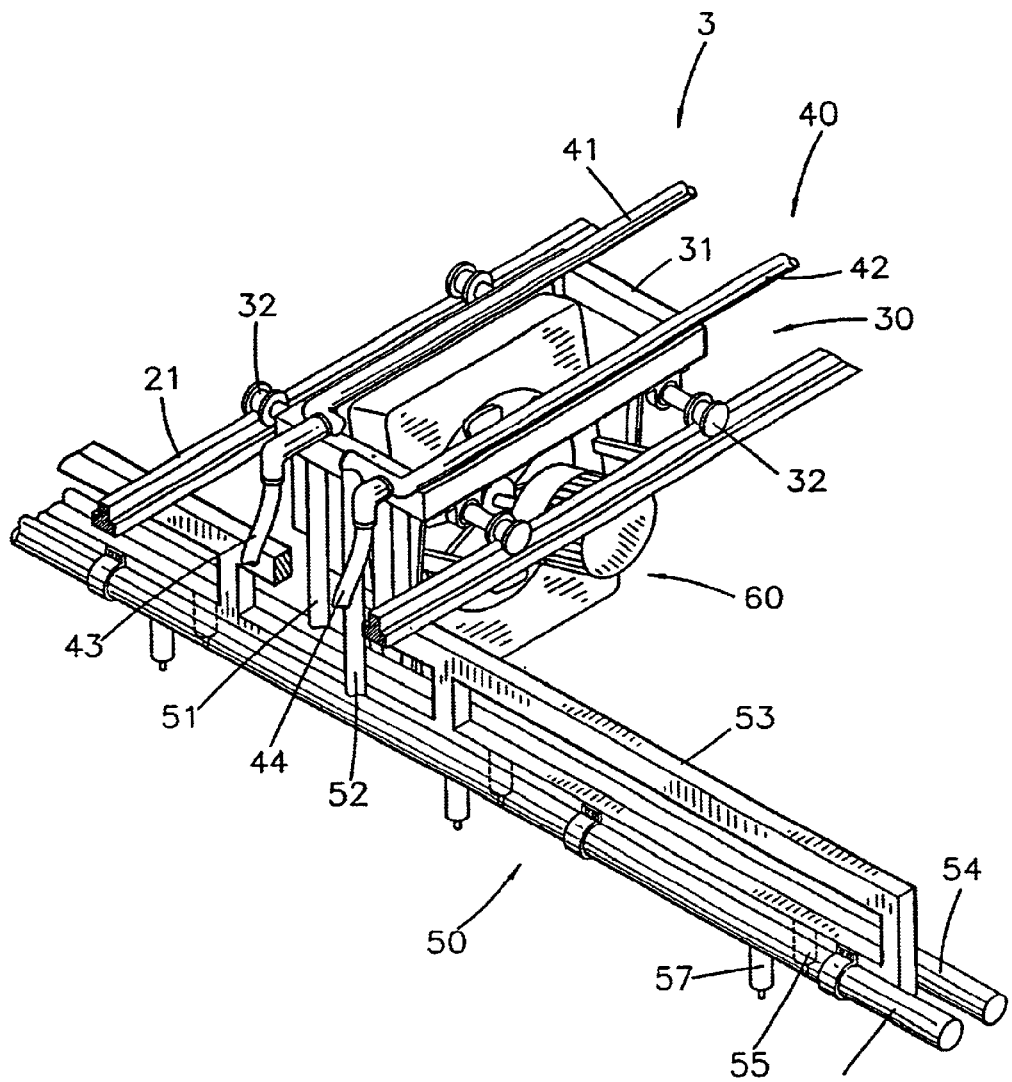
FIG. 1 is a perspective view of an automatically reciprocal multi-stage supply and ventilation system in accordance with the present invention.

Referring to the drawings and initially to FIGS. 1–4, an automatically reciprocal multi-stage supply and ventilation system in accordance with a preferred embodiment of the present invention is mounted in a warm house 20 and comprises two parallel tracks 21 mounted in the warm house 20, and at least one set of material supply circulation unit 3 mounted on the tracks 21.

The material supply circulation unit 3 includes a carrier device 30, a feeding device 40, a material distribution device 50, a nozzle device, and a ventilation device 60.

The carrier device 30 includes a plurality of carriers 31 each of which is provided with rollers 32, wherein one set of rollers 32 is connected to and driven by a drive mechanism 33 (see FIG. 4) such as a motor, chain or the like, thus, the rollers 32 of each of the carriers 31 may be driven by the drive mechanism 33 to rotate on the tracks 21, so that the carrier device 30 may be moved along the tracks 21 reciprocally.

The feeding device 40 includes a water supply pipe 41, a material supply pipe 42, a water inlet pipe 43 made of a soft hose, and a material inlet pipe 44 made of a soft hose. The water supply pipe 41 and the material supply pipe 42 are secured on the carrier device 30. The water inlet pipe 43 has a first end connected to the water supply pipe 41 and a second end connected to a water source. The material inlet pipe 44 has a first end connected to the material supply pipe 42 and a second end connected to a storage tank that contains fertilizer, pesticide or the like therein.

Figure 4:
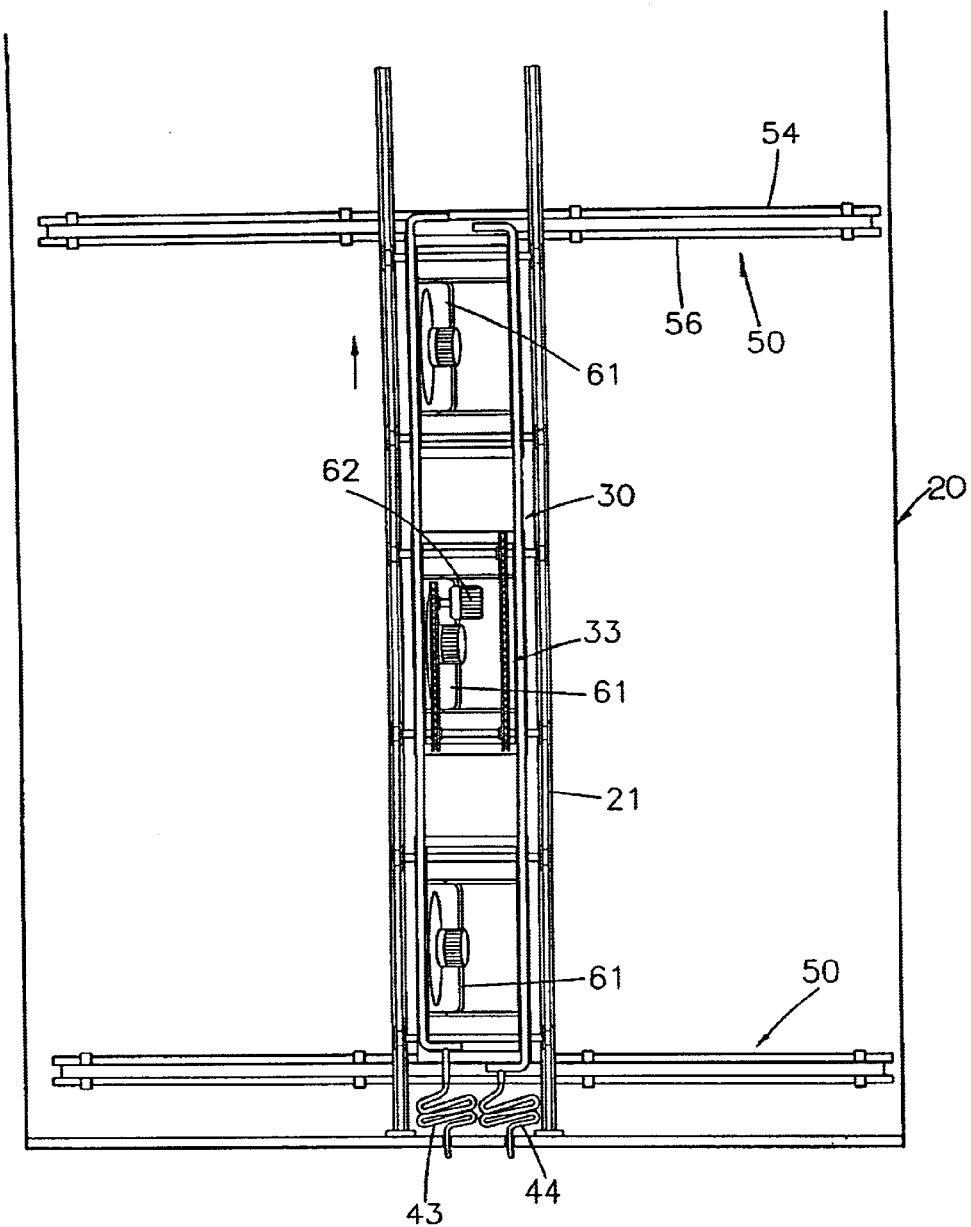
FIG. 4 is a plan view of the automatically reciprocal multi-stage supply and ventilation system in accordance with the present invention.
Figure 5:
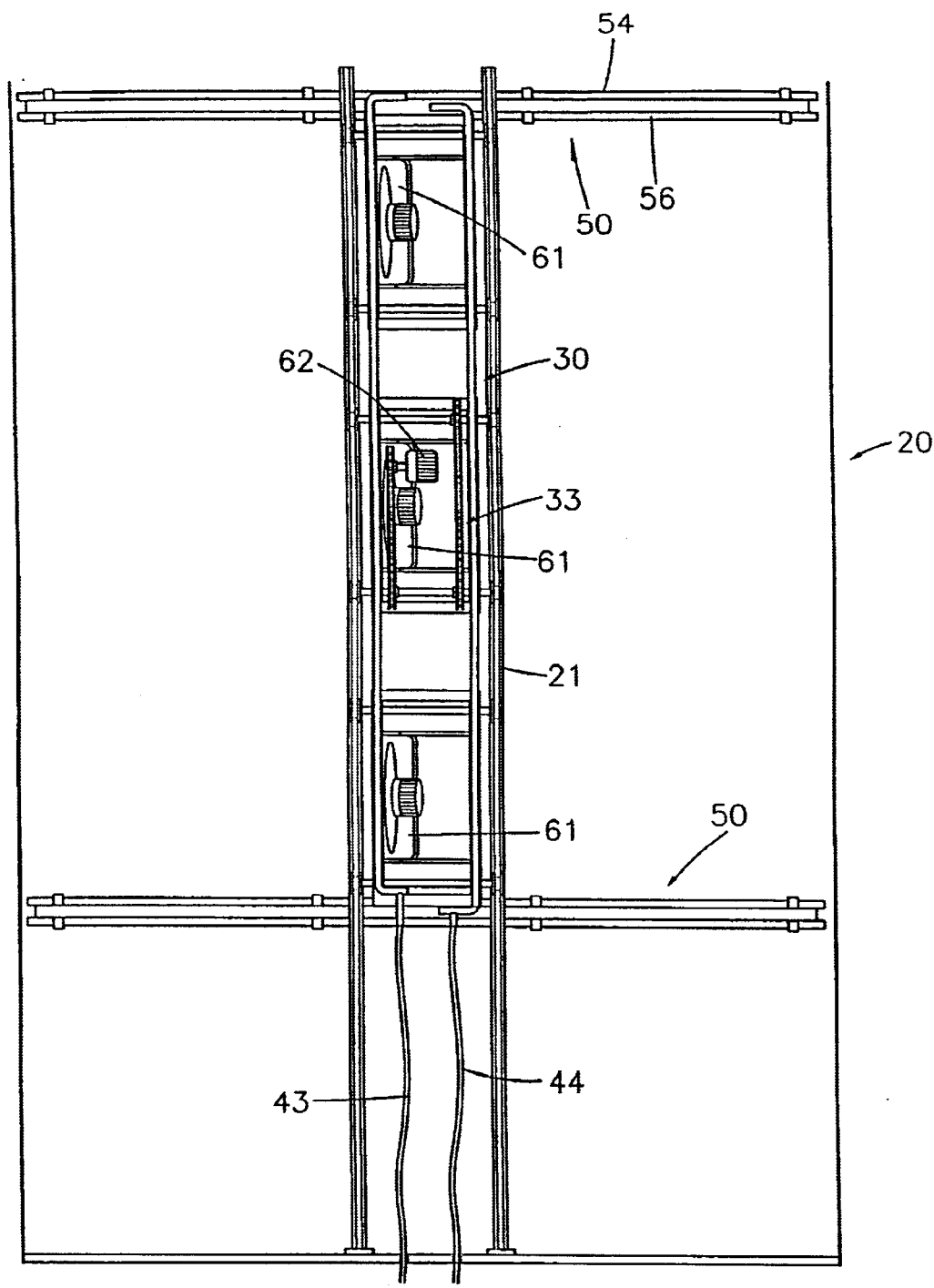
FIG. 5 is a schematic operational view of the automatically reciprocal multi-stage supply and ventilation system as shown in FIG. 4 in use.

As shown in FIG. 4, the material supply circulation unit 3 has two ends each provided with a material distribution device 50 respectively.

The material distribution device 50 includes a water guide pipe 51, a material guide pipe 52, a fixing frame 53, a water distribution pipe 54, and a material distribution pipe 56.

The water guide pipe 51 has a first end connected to the water supply pipe 41 and a second end connected to the water distribution pipe 54. The material guide pipe 52 has a first end connected to the material supply pipe 42 and a second end connected to the material distribution pipe 56. The fixing frame 53 is secured on the carrier device 30 to move therewith. The water distribution pipe 54 and the material distribution pipe 56 are secured on the fixing frame 53.

The nozzle device includes multiple water spray nozzles 55 and material spray nozzles 57. The water spray nozzles 55 are mounted on the water distribution pipe 54 for spraying and supplying water, and the material spray nozzles 57 are mounted on the material distribution pipe 56 for spraying and supplying fertilizer or pesticide.

Figure 6:
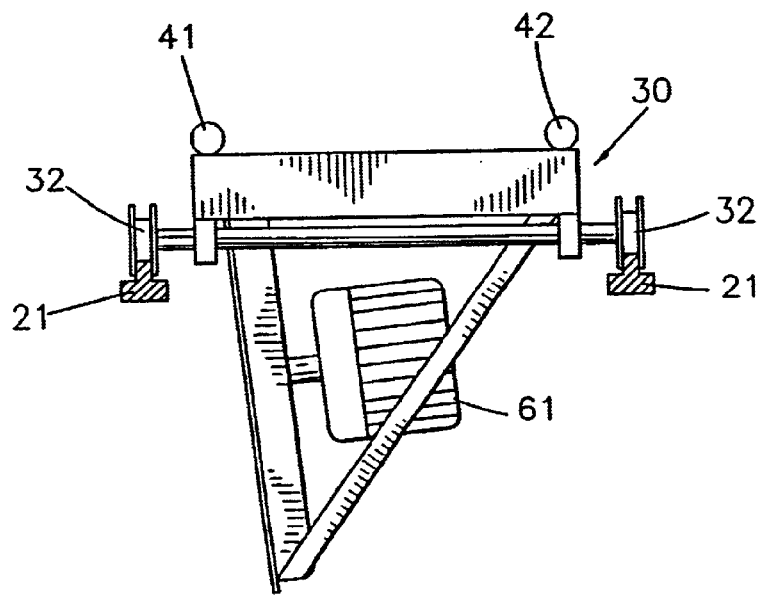
FIG. 6 is a plan view of a ventilation device of the automatically reciprocal multi-stage supply and ventilation system in accordance with the present invention.

As shown in FIGS. 1 and 6, the ventilation device 60 includes fans 61 and motors 62 (see FIG. 4). The fan 61 is secured on each carrier 31 of the carrier device 30, and the motor 62 is secured on one side of the fan 61.

Figure 7:
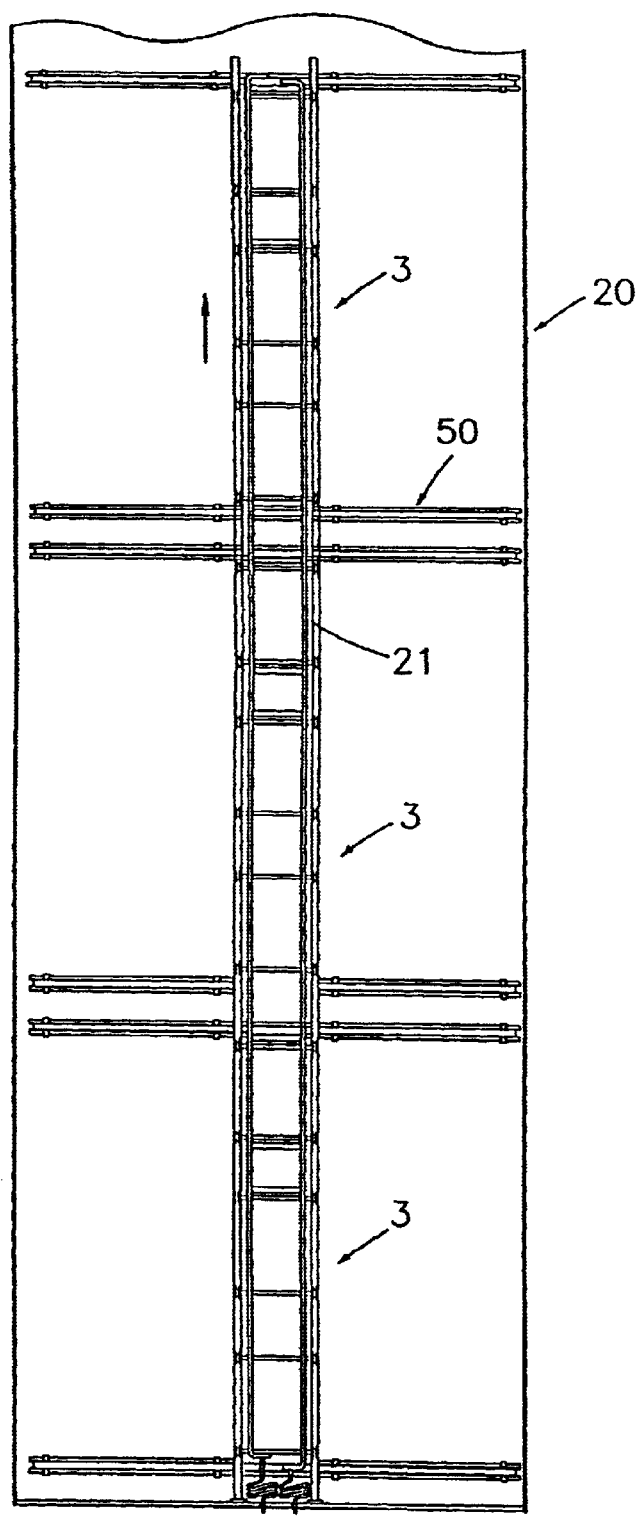
FIG. 7 is a plan view of the automatically reciprocal multi-stage supply and ventilation system in accordance with the present invention.
Figure 8:
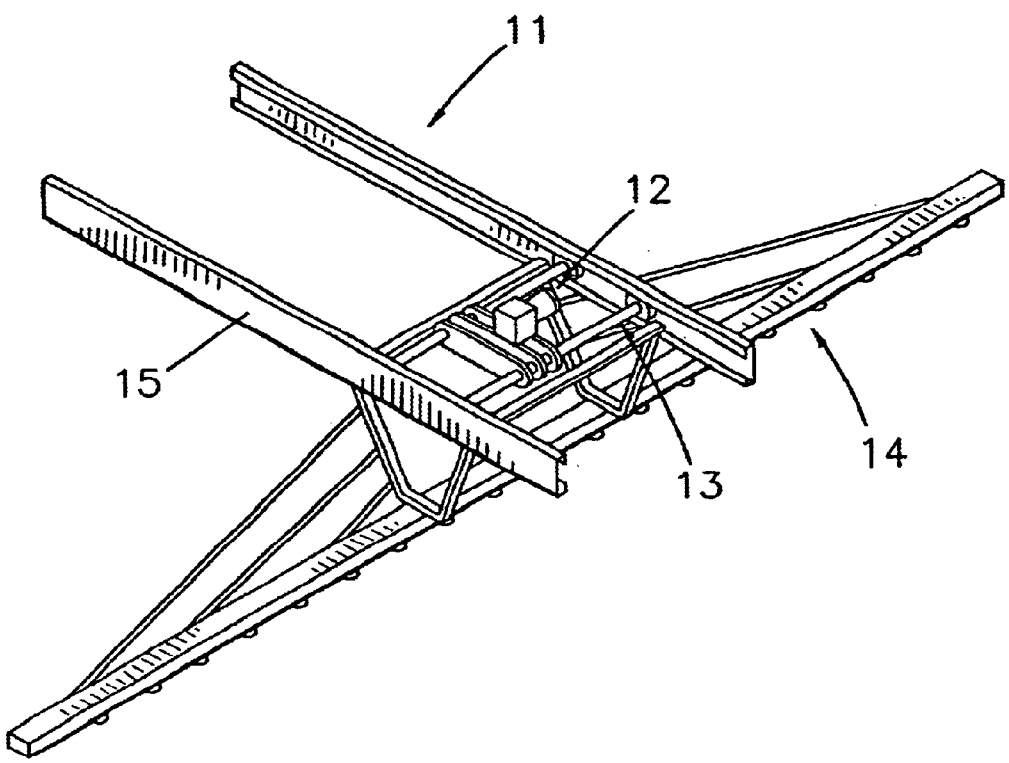
FIG. 8 is a schematic view of a conventional automatic sprinkler in accordance with the prior art.

Referring to FIG. 7, the automatically reciprocal multi-stage supply and ventilation system in accordance with the present invention comprises multiple sets of material supply circulation units 3 each having two ends each provided with a material distribution device 50 respectively.

Figure 2:
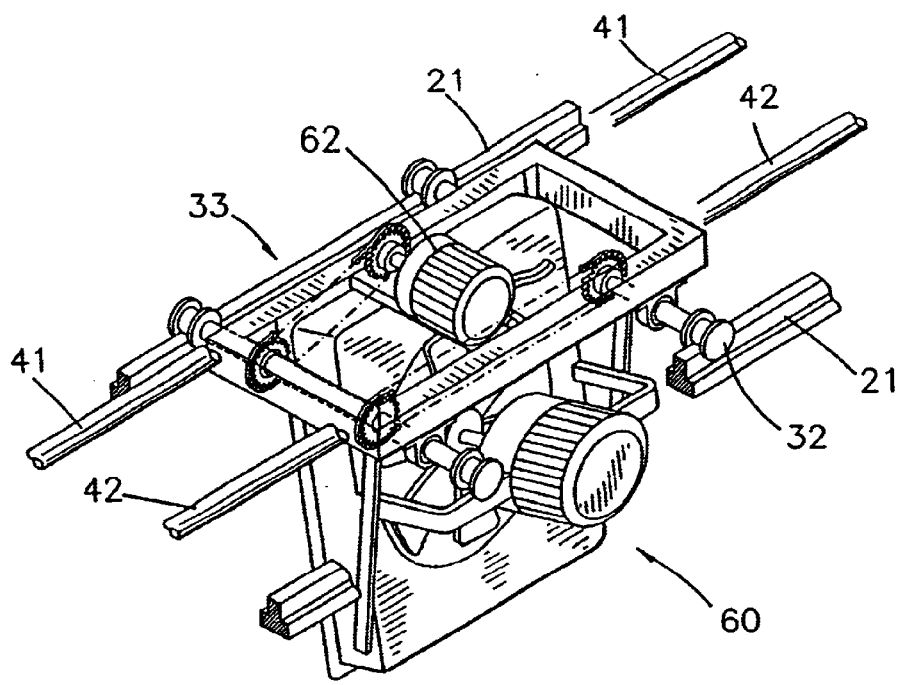
FIG. 2 is a locally perspective view of the automatically reciprocal multi-stage supply and ventilation system in accordance with the present invention.
Figure 3:
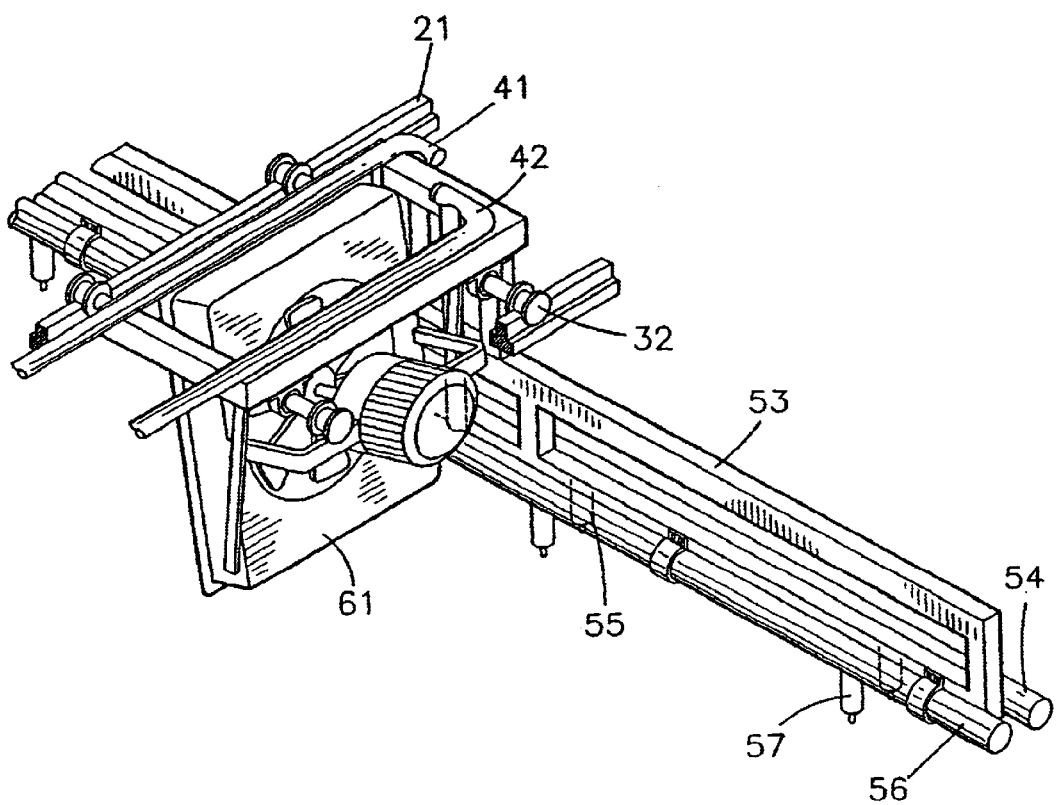
FIG. 3 is a perspective view of the automatically reciprocal multi-stage supply and ventilation system in accordance with the present invention.

Referring to FIGS. 4–7 with reference to FIGS. 1–3, the water may be supplied through the water inlet pipe 43, and the fertilizer or pesticide may be supplied through the material inlet pipe 44. The carrier device 30 may be moved on the tracks 21 reciprocally, so that the water, and the fertilizer or the pesticide on the material distribution device 50 may be evenly sprayed onto the plant in the warm house 20. Thus, the automatically reciprocal multi-stage supply and ventilation system in accordance with the present invention may be moved reciprocally and automatically to provide the water, and the fertilizer or the pesticide evenly, thereby saving manual work, and thereby growing the plant evenly. In addition, the water, and the fertilizer (or pesticide) are sprayed outward through the water spray nozzles 55 and the material spray nozzles 57 respectively, thereby preventing the nozzle device from being blocked.

Further, the fans 61 are moved with movement of the carrier device 30 so as to move reciprocally, so that the ventilation device 60 may provide an evenly distributed ventilating effect to the plant in the warm chamber 20.

Further, multiple material supply circulation units 3 are mounted on the tracks 21, and are connected by the water supply pipe 41 and the material supply pipe 42. Thus, the multiple material supply circulation units 3 may be adapted to form a multi-stage structure that may be used in a larger warm house 20. The water, and the fertilizer or the pesticide may be input from one end of the multi-stage structure, through the connected water supply pipe 41 and the material supply pipe 42, into each of the multiple material supply circulation units 3. Thus, each of the multiple material supply circulation units 3 may be moved through a small spraying stroke as shown in FIG. 7, thereby saving time of work. In addition, each of the multiple material supply circulation units 3 has a small spraying stroke, so that the length of the water inlet pipe 43 and the material inlet pipe 44 may be shortened, thereby preventing the water inlet pipe 43 and the material inlet pipe 44 from being tangled with each other or tangled with other electric lines.

Further, each of the multiple material supply circulation units 3 of the multi-stage structure has its own material distribution device 50 and nozzle device whose conditions of operation (such as spraying time, spraying amount or the like) may be controlled independently and respectively according to the practical requirements, so that the multiple material supply circulation units 3 of the multi-stage structure may be used to cultivate plants that need different cultivation conditions and states.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. An automatically reciprocal multi-stage supply and ventilation system, comprising: two parallel tracks, and at least one set of material supply circulation unit mounted on the tracks, the at least one material supply circulation unit including a carrier device, a feeding device, a material distribution device, a nozzle device, and a ventilation device, wherein:

the carrier device includes a plurality of carriers each of which is provided with rollers, one set of the rollers is connected to and driven by a drive mechanism, so that the rollers of each of the carriers may be driven by the drive mechanism to rotate on the tracks, so that the carrier device may be moved along the tracks reciprocally;

the feeding device includes a water supply pipe, a material supply pipe, a water inlet pipe made of a soft hose, and a material inlet pipe made of a soft hose, the water supply pipe and the material supply pipe are secured on the carrier device, the water inlet pipe has a first end connected to the water supply pipe and a second end connected to a water source, and the material inlet pipe has a first end connected to the material supply pipe and a second end connected to a storage tank that contains fertilizer or pesticide therein;

the material distribution device includes a water guide pipe, a material guide pipe, a fixing frame, a water distribution pipe, and a material distribution pipe, the water guide pipe has a first end connected to the water supply pipe and a second end connected to the water distribution pipe, the material guide pipe has a first end connected to the material supply pipe and a second end connected to the material distribution pipe, the fixing frame is secured on the carrier device to move therewith, the water distribution pipe and the material distribution pipe are secured on the fixing frame;

the nozzle device includes multiple water spray nozzles and material spray nozzles, the water spray nozzles are mounted on the water distribution pipe, and the material spray nozzles are mounted on the material distribution pipe; and the ventilation device is secured on the carrier device to move therewith.

2. The automatically reciprocal multi-stage supply and ventilation system in accordance with claim 1, wherein the ventilation device includes multiple fans and motors, each of the fans is secured on each carrier of the carrier device, and each of the motors is secured on one side of the respective fan.

3. The automatically reciprocal multi-stage supply and ventilation system in accordance with claim 1, wherein the at least one material supply circulation unit has two ends each provided with a material distribution device respectively.

* * * * *